UNITED STATES PATENT OFFICE.

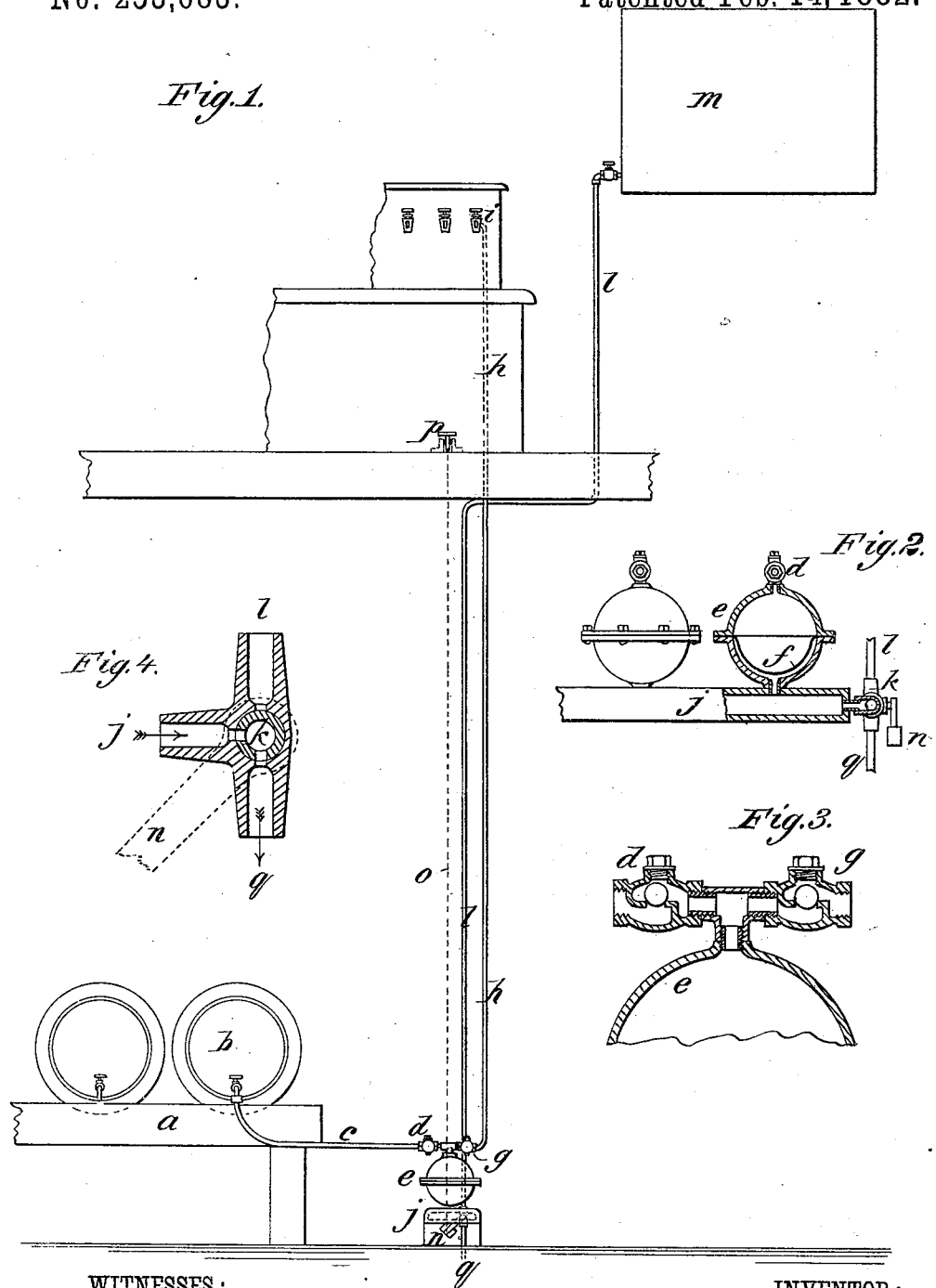

PETER J. CATTERALL AND EDWARD BIRCH, OF MANCHESTER, COUNTY OF LANCASTER, ENGLAND.

APPARATUS FOR RAISING BEER, &c.

SPECIFICATION forming part of Letters Patent No. 253,683, dated February 14, 1882.

Application filed October 19, 1881. (No model.) Patented in England July 21, 1881.

*To all whom it may concern:*

Be it known that we, PETER JAMES CATTERALL and EDWARD BIRCH, both of Manchester, in the county of Lancaster, England, have invented a new and useful Method of and Apparatus for Raising Beer and other Liquids, (for which we have obtained a patent in Great Britain, No. 3,173, bearing date July 21, 1881,) of which the following is a specification.

Our invention relates to apparatus for raising beer and other liquids; and the object of our improvements is to raise beer, wine, spirits, or other liquid from barrels or vessels in a cellar or other place to the bar or other part of a hotel or building without the exertion of hand-labor. We attain this object by the apparatus illustrated in the accompanying drawings, in which—

Figure 1 is an elevation of the entire apparatus; Fig. 2, a view showing two chambers (one in section) used in raising the liquid; Fig. 3, a longitudinal section of the back-pressure valves, through one of which the liquid is admitted to the chamber, and through the other the liquid is forced to the bar or delivery-tap. Fig. 4 is a section of the three-way tap that admits and discharges the water used to raise the beer or other liquid.

Similar letters refer to similar parts throughout the several views.

$a$ is the stillage. $b$ is the barrel containing the beer or other liquid to be raised. To the tap of this barrel is connected one end of a flexible tube, $c$, the other end of which is connected to a back-pressure valve, $d$, communicating with the upper part of the chamber $e$. This chamber is made in halves, and a diaphragm, $f$, of india-rubber or other pliant or flexible material, is fitted in the chamber, the periphery of the diaphragm being even with the periphery of the flanges of the halves of the chamber, which are then bolted together. This diaphragm effectually prevents any liquid admitted to the upper part of the chamber $e$ from mingling with the water admitted to the lower part of the chamber $e$. The upper part of the chamber $e$ communicates through the valve $g$ and pipe $h$ with the tap $i$. The lower part of the chamber $e$ is fitted on a water-chest, $j$, to which water is admitted through a three-way tap, $k$, and pipe $l$ from the cistern $m$. The tap $k$ has a weighted lever, $n$. (Partly shown in dotted lines on Fig. 4.) To this lever is attached one end of a wire or cord, $o$, the other end of which is fastened to a treadle, $p$, near the floor, below the tap $i$. The tap $k$ is for convenience connected to the chest $j$ by a short elbow, and to the lower part of the tap is connected a waste-pipe, $q$.

The mode of operation is as follows: The beer flows from the barrel $b$ through the tube $c$ and the valve $d$, and fills the chamber $e$, pressing the diaphragm $f$ into the position shown on Fig. 2. When it is wished to draw beer the tap $i$ is opened and the treadle $p$ is operated to turn the three-way tap $k$, so as to admit water from the cistern $m$ through the pipe $l$, tap $k$, and chest $j$ into the lower part of the chamber $e$. The pressure of the water forces up the diaphragm $f$, and raises the beer through the pipe $h$ and delivers it through the tap $i$. The back-pressure valve $d$ prevents any beer from being forced back into the barrel. When sufficient beer has been drawn the treadle $p$ is released, and the weighted lever $n$ brings the tap $k$ into the position shown on Fig. 4, and shuts off the supply of water through the pipe $l$, and allows the water to escape from the chamber $e$ and chest $j$ through the waste-pipe $q$, and the beer from the barrel $b$ again fills the chamber $e$.

We use enameled pipes to convey the beer or other liquor from the barrel to the delivery-tap to avoid injury to the flavor.

Any desired number of chambers $e$ may be fitted on the chest $j$, each chamber being connected to a separate barrel or vessel containing any kind of liquid to be raised, and to a separate tap $i$ to deliver the liquid, the water-supply being common to all the chambers fitted on the chest.

The chamber $e$ may be of any convenient shape, and the diaphragm, of india rubber or other material, may be fitted in the chamber in any suitable manner.

A cylindrical chamber might be used, fitted with a piston instead of a flexible diaphragm.

The water may be supplied to the chamber $e$ from any convenient source instead of the cistern $m$; but the pressure must always be sufficient to raise the beer or other liquid from the chamber $e$ to the tap $i$.

What we claim as our invention, and desire to secure by Letters Patent, is—

1. In an apparatus for raising liquids, the combination, with the barrel $b$, the tap $i$, and the cistern $m$, of the chamber $e$, provided with the flexible diaphragm $f$, the tube $c$, the pipes $h\,l$, and the water-chest $j$, substantially as and for the purpose set forth.

2. In an apparatus for raising liquids, the combination, with the barrel $b$, the tap $i$, the cistern $m$, tube $c$, and the pipes $h\,l$, of the chamber $e$, provided with the flexible diaphragm $f$ and the valves $d\,g$, and the water-chest $j$, substantially as and for the purpose set forth.

3. In an apparatus for raising liquids, the combination, with the chamber $e$, the water-chest $j$, and pipe $l$, of the three-way tap $k$, provided with the weighted lever $n$, substantially as and for the purpose set forth.

4. In an apparatus for raising liquids, the combination, with the chamber $e$, the water-chest $j$, and the pipe $l$, of the three-way tap $k$, provided with the weighted lever $n$ and waste-pipe $q$, the cord $o$, and the treadle $p$, substantially as and for the purpose set forth.

PETER JAMES CATTERALL.
EDWARD BIRCH.

Witnesses:
CHARLES A. BARLOW,
HERBERT R. ABBEY.